Nov. 29, 1932.   S. FRIEDMANN   1,889,047
COUPLING FOR TYPEWRITER LINE SPACING WHEELS
Filed June 19, 1931

INVENTOR:
Sebastian Friedmann
BY
Emil Börnelycke
ATTORNEY.

Patented Nov. 29, 1932

1,889,047

UNITED STATES PATENT OFFICE

SEBASTIAN FRIEDMANN, OF SOMMERDA, THURINGIA, GERMANY, ASSIGNOR TO RHEINISCHE METALLWAAREN- UND MASCHINENFABRIK SOMMERDA AKTIENGESELLSCHAFT, OF SOMMERDA, THURINGIA, GERMANY, A CORPORATION OF GERMANY

COUPLING FOR TYPEWRITER LINE SPACING WHEELS

Application filed June 19, 1931, Serial No. 545,544, and in Germany June 21, 1930.

In U. S. Patent No. 1,792,105 dated February 10, 1931, a device is described for coupling the line-spacing wheel of a typewriter or other similar machine with the platen, in which one or more coupling bolts are mounted in the cap of the platen parallel to a diameter or chords of the cap, so that the end surface of the bolts, when rotated through a small angle about their axes, project beyond the bearing surface of the cap and engage with the inner surface of the line-spacing wheel.

In this arrangement there is the drawback that the coupling bolt or bolts must be rotated through a relatively large angle before the coupling is fully effective by the end surfaces of the bolts projecting to a sufficient extent from the cylindrical surface of the cap of the platen.

A small clearance must obviously be provided between the line spacing wheel and the cap of the platen, with the result that the line spacing wheel is deformed from its circular form by the radially directed pressure of the coupling bolt. The diameter or the chords of the line-spacing wheel in line with the coupling bolts is increased, although certainly only to a very small extent, and the diameter at right angles to the bolts is reduced, so that the part of the line spacing wheel at right angles to the coupling bolt engages tightly with the cylindrical portion of the cap of the platen. If the clearance between the line spacing wheel and the cap of the platen only amounts to some hundreds of a mm., there is the objection that, owing to the large transmission ratio of the means for manually rotating the coupling bolts, the movement of the hand-knob provided for this purpose is considerably increased. This drawback is obviated by the present invention.

Figure 1:
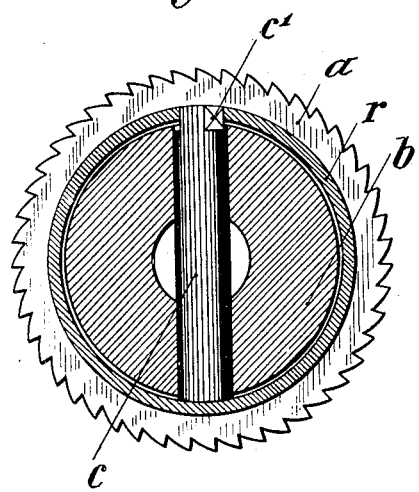

In the accompanying drawing, Fig. 1 is a vertical cross section showing certain parts in elevation of a coupling for line spacing wheels.

Figure 2:
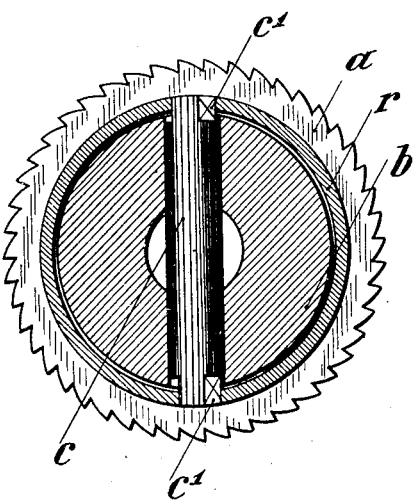
Figure 3:
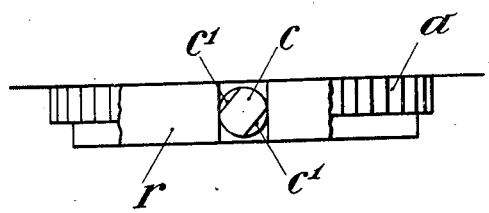
Figure 4:
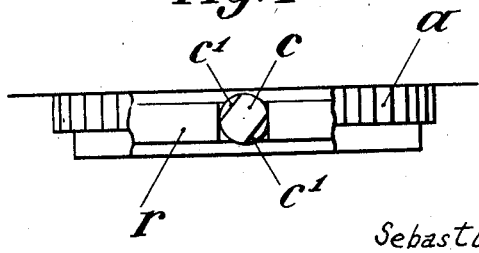

Fig. 2 is a similar view of a modified construction. Figs. 3 and 4 are top views showing parts broken away.

In the figures, the clearance between the line spacing wheel and the cap of the platen is very much exaggerated.

In the line spacing wheel shown in Patent No. 1,792,105 it will be noted that it has been deformed into a non-circular form and its diameter in the direction of the bolt has been increased by the action of the coupling bolt pressing against the inner surface of the line-spacing wheel.

In order to prevent such deformation of the line-spacing wheel, Figs. 1–4 show a split ring $r$ inserted between the line-spacing wheel $a$ and the cap of the platen $b$. One end of the coupling bolt $c$, or both ends as in Fig. 2, is flattened on each side $c_1$ to form a short bar which in the uncoupled position is parallel to the axis of the platen. The bar enters into the slot of the ring $r$, the end surfaces of which are in contact with the flat sides of the bar. The other end of the coupling bolt $c$ is ground with the ring $r$, after assembling, to form a cylindrical surface, so that when the bolt $c$ is rotated about its longitudinal axis as in the said Patent No. 1,792,105, the reduced end of the bar on the coupling bolt projects from the cylindrical surface of the cap of the platen and by pressing on the inner surface of the line-spacing wheel $a$, couples the parts together. At the same time, the corners of the flat sides of the bar due to their angular position, force the parts of the ring apart and into contact with the line-spacing wheel $a$, which, consequently, maintains its circular form. The clearance that must be provided in the uncoupled position, in order that the line-spacing wheel $a$ may rotate easily, is, as the drawing shows, prevented from acting prejudicially on the action of the coupling. In this arrangement, the coupling action of the bolt $c$ is supported by the engagement of the outer surface of the tensioned ring with the inner surface of the line-spacing wheel $a$.

The width of the ring $r$ can be the same as that of the line-spacing wheel $a$, as shown in Fig. 3, or it may be less, as shown in Fig. 4; and in the latter case it is inserted in a groove of the cap of the platen. The principal difficulties in providing a satisfactory coupling for the line-spacing wheel are due to inaccuracies in the working, which cannot be entirely prevented in the manufacture of the separate parts and in the assembly of the apparatus consisting of several members. Very small inaccuracies, of one-hundredth of a mm. in the dimensions are often of considerable importance.

The parts of the coupling are constructed at first, so as to be only approximately correct, the length of the bolt $c$ and the diameter of the ring $r$ being left intentionally somewhat larger in order to be finally reduced to the correct dimensions. In the assembling of the couplings, before their insertion in the line-spacing wheel, the bolt $c$ and the ring $r$ are ground together until the hub prepared in this manner is introduced into the inner bore of the line-spacing wheel so as to fit correctly. In this manner, small errors in the position of the coupling members (pin $c$ and ring $r$), due, for example, to slight inaccuracy in the proportions of the separate parts of the coupling and to slight errors in assembling, are of no importance, since they are obviated by the subsequent compensating grinding. This method of assembling and finishing with the special preparation of the ends can be conveniently carried out with the coupling according to the invention, since the ring $r$ is tightly held in its groove and at the same time holds the bolt $c$ in its position.

The bolt $c$, which in Fig. 1 is flattened at one end only, could also be similarly flattened at both ends, as shown in Fig. 2, and the ring $r$ would then be formed in two halves or parts.

I claim as my invention:

1. A coupling for line-spacing wheels of typewriting or other similar machines, comprising a platen and a cap secured to the platen, a bolt mounted in the cap, so that, when rotated about its longitudinal axis it projects beyond the interior surface of the said cap, a split ring inserted between the cap and the line-spacing wheel, one end of the said bolt being provided with flat portions parallel to its longitudinal axis to form a short bar between the end surfaces of the said split ring, by which the parts of the ring are forced apart when the bolt is rotated into its coupling position.

2. A coupling according to claim 1, in which the said bolt is flattened at each end and the said ring is formed in two halves.

3. A coupling for the line spacing wheel of the platen of a typewriter and the like, comprising a bolt provided for the platen and having its end adjacent the line spacing wheel, and a split ring provided between the platen and the line spacing wheel, said bolt having a pair of flattened portions projecting into and between the ends of the ring formed by the split therein, and said bolt upon being rotated contacting by its ends the line spacing wheel to couple it with the platen and forcing the ring against the line spacing wheel by the flat portions forcing the split ends outwardly to maintain the wheel in its circular form.

4. A coupling for the line spacing wheel of the platen of a typewriter and the like, comprising a bolt provided for the platen and having its ends adjacent the line spacing wheel, and a two-part ring provided between the platen and the line-spacing wheel, said bolt having a pair of flattened portions at each end projecting between two ends of the ring, and said bolt upon being rotated contacting by its ends the line spacing wheel to couple it with the platen and forcing the ring parts against the line spacing wheel by the flat portions to maintain the wheel in its circular form.

5. A coupling for the line spacing wheel of the platen of a typewriter and the like, comprising a bolt provided for the platen and having its ends adjacent the line spacing wheel so that when rotated the ends will contact the line spacing wheel to couple it with the platen, and a ring provided between the platen and the line spacing wheel, said bolt having means on one end to force the ring against the line spacing wheel when the bolt is rotated to maintain the circular form of the wheel when coupled to the platen.

6. A coupling for the line spacing wheel of the platen of a typewriter and the like, comprising a bolt provided for the platen and having its ends adjacent the line spacing wheel so that when rotated the ends will contact the line spacing wheel to couple it with the platen, and a ring provided between the platen and the line spacing wheel, said bolt having means on each end to force the ring against the line spacing wheel when the bolt is rotated to maintain the circular form of the wheel when coupled to the platen.

In testimony whereof I have affixed my signature.

SEBASTIAN FRIEDMANN.